US005848528A

United States Patent [19]
Liu

[11] Patent Number: 5,848,528
[45] Date of Patent: Dec. 15, 1998

[54] OPTIMIZATION OF CLOSED-LOOP AND POST O2 FUEL CONTROL BY MEASURING CATALYST OXYGEN STORAGE CAPACITY

[75] Inventor: Ching-Po Liu, Grand Blanc, Mich.

[73] Assignee: Siemens Automotive Corporation, Auburn Hills, Mich.

[21] Appl. No.: 911,536

[22] Filed: Aug. 13, 1997

[51] Int. Cl.$^6$ ............................... F01N 3/20; F02D 41/14
[52] U.S. Cl. ............................... 60/274; 60/276; 60/285; 123/696
[58] Field of Search ............................... 60/274, 276, 277, 60/285; 123/696

[56] References Cited

U.S. PATENT DOCUMENTS

| | | | |
|---|---|---|---|
| 4,878,473 | 11/1989 | Nakaniwa et al. | 123/691 |
| 5,083,427 | 1/1992 | Anderson | 60/274 |
| 5,159,810 | 11/1992 | Grutter et al. | 60/274 |
| 5,228,335 | 7/1993 | Clemmens et al. | 73/118.1 |
| 5,379,591 | 1/1995 | Iwata et al. | 60/276 |
| 5,381,658 | 1/1995 | Meguro | 60/276 |
| 5,385,016 | 1/1995 | Zimlich et al. | 60/274 |
| 5,390,490 | 2/1995 | Brooks | 60/276 |
| 5,412,942 | 5/1995 | Mukai et al. | 60/276 |
| 5,487,269 | 1/1996 | Atanasyan et al. | 60/274 |
| 5,499,500 | 3/1996 | Hamburg et al. | 60/274 |
| 5,544,481 | 8/1996 | Davey et al. | 60/274 |
| 5,623,824 | 4/1997 | Yukawa et al. | 60/276 |
| 5,678,402 | 10/1997 | Kitagawa et al. | 60/277 X |

*Primary Examiner*—Tony M. Argenbright

[57] ABSTRACT

A method of automobile engine fuel control is disclosed which senses the condition of the automobile's catalytic converter for the purpose of varying the fuel control function to optimize the performance of the catalytic converter and lower the automobile's tail pipe emissions. In accordance with the method of the present invention, the oxygen storage capacity of the catalytic converter is determined from the oxygen content in the automobile's exhaust metering by sensors located before and after the catalytic converter. Where the oxygen storage capacity of the catalytic converter is high, such as in a new automobile, a higher proportional gain is used in metering the amount of fuel to be sprayed into to engine in response to a lean or rich fuel condition. Conversely, where the oxygen storage capacity is reduced, such as in the catalytic converter in a old car, a smaller proportional gain is used in metering the amount of fuel to be sprayed into the engine.

15 Claims, 6 Drawing Sheets

OPTIMIZATION OF CLOSED-LOOP AND POST O2 FUEL CONTROL BY MEASURING CATALYST OXYGEN STORAGE CAPACITY

BACKGROUND OF THE INVENTION

1. Field of the Invention

The present invention relates to fuel controls, and more particularly, to a method for optimizing fuel control using the oxygen storage capacity of a catalytic converter's catalyst.

2. Background Information

Automobile engines manufactured today typically use a fuel injection system to inject the fuel that is burned in the engine. Typically, the fuel injection system includes a number of fuel injectors for injecting the fuel into the engine's cylinders. The injectors are controlled by a microcomputer in the automobile, often referred to as an ECU ("Electronic Control Unit") or a PCM ("Power Train Control Module").

To control the amount of fuel injected into the engine, a first sensor senses the amount of oxygen in the engine's exhaust prior to the automobile's catalytic converter, while a second sensor senses the amount of oxygen in the exhaust emitted from the catalytic converter. The output signals from the oxygen sensors are fed to the microcomputer for the purpose of controlling the amount of fuel injected into the engine. In reading the sensor signals, if the microcomputer senses the presence of a high amount of oxygen in the automobile exhaust, it concludes that the air fuel mixture is lean and causes the fuel injectors to spray additional fuel into the engine. Conversely, if the microcomputer determines from the sensor signals that the air fuel mixture is rich, it causes the fuel injectors to spray less fuel into the engine.

A catalytic converter is a device which contains catalysts for converting automobile exhaust into mostly harmless products. For each catalytic converter, there is an optimum air fuel ratio operating window that will allow the catalytic converter to operate efficiently, and thereby reduce tale pipe emissions. This window, however, will vary as the converter ages. Thus, the optimum air fuel ratio window for a catalytic converter that is new, e.g., a converter at four thousand miles, will not be the same when that converter is old, e.g., one hundred thousand miles.

SUMMARY OF THE INVENTION

It is an object of the present invention to provide a method of automobile engine fuel control that allows catalytic converter efficiency to be increased so as to lower tail pipe emissions. It is another object of the present invention to provide a method of fuel control that senses the condition of an automobile's catalytic converter in performing the fuel control function. It is a further object of the present invention to provide a method of fuel control which uses the oxygen storage capacity of an automobile's catalytic converter to optimize the fuel control function.

The present invention is directed to a method of automobile engine fuel control which senses the condition of the automobile's catalytic converter for the purpose of varying the fuel control function to optimize the performance of the catalytic converter and lower the automobile's tail pipe emissions. In accordance with the method of the present invention, the oxygen storage capacity of the catalytic converter is determined from the oxygen content in the automobile's exhaust measured by sensors located before and after the catalytic converter. Where the oxygen storage capacity of the catalytic converter is high, such as in a new automobile, a higher proportional gain is used in metering the amount of fuel to be sprayed into to engine in response to a lean or rich fuel condition. Conversely, where the oxygen storage capacity is reduced, such as in the catalytic converter in a old car, a smaller proportional gain is used in metering the amount of fuel to be sprayed into the engine.

DETAILED DESCRIPTION OF THE PREFERRED EMBODIMENT

Figure 1:
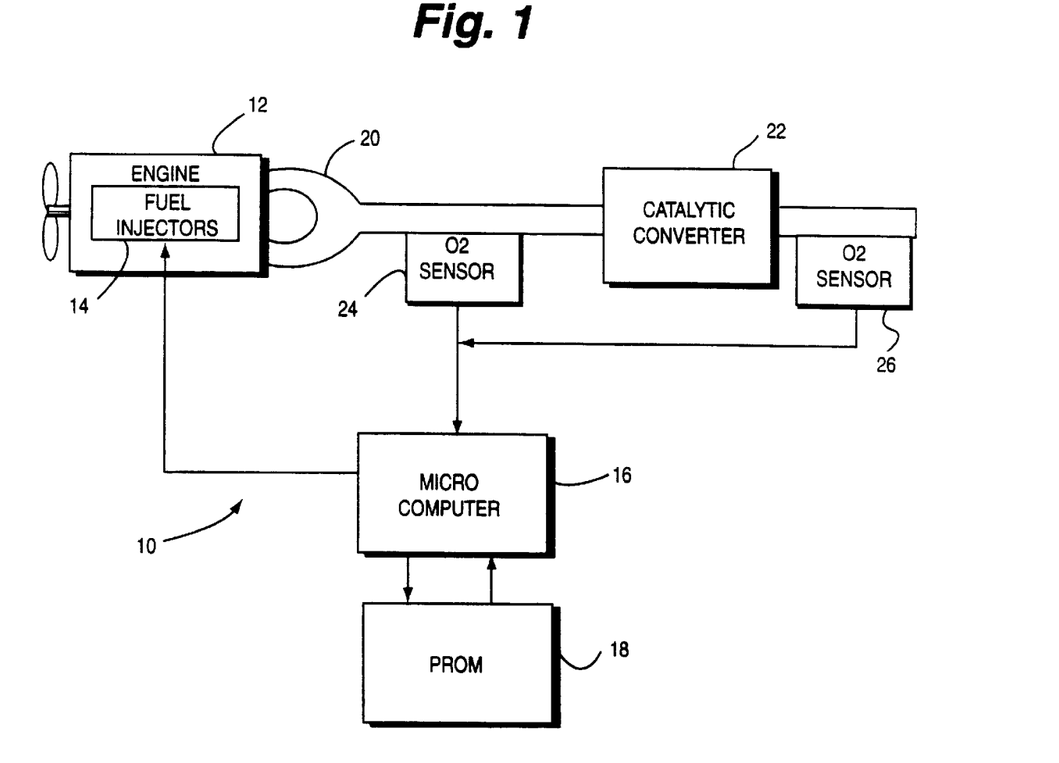
FIG. 1 is a block diagram showing various components used in a typical fuel control arrangement.

FIG. 1 shows a fuel control system 10 typically used in automobile engines manufactured today. The automobile engine 12 includes a number of fuel injectors 14 for injecting fuel into the engine cylinders. Injectors 14 are controlled by a microcomputer 16, which communicates with a programmable read only memory ("PROM") 18 to obtain the instructions and data used in metering the fuel injectors 14.

The fuel burned by engine 12 is exhausted through exhaust system 20, which includes a catalytic converter 22 for reducing tail pipe emissions. To control the mixture of air and fuel injected into the engine 22, microcomputer 16 receives data signals from a first sensor 24 for sensing the amount of oxygen in engine 12's exhaust prior to catalytic converter 22 and from a second sensor 26 which senses the amount of oxygen in the exhaust emitted from the catalytic converter 22. The optimal ratio of air to fuel for an engine which burns gasoline is 14.6.

After an appropriate conversion to a digital format, the output signals from oxygen sensors 24 and 26 are fed to the microcomputer 16. In sensing the amount of oxygen in the automobile exhaust, microcomputer 16 will cause the fuel injectors 14 to spray more or less fuel into engine 12, depending on whether it determines the air fuel mixture to be lean or rich. If microcomputer 16 determines that the air fuel mixture in the engine is lean, it will adjust fuel injectors 14 to spray a larger amount of fuel into the cylinders of engine 12. Conversely, if microcomputer 16 determines that the air fuel mixture in engine 12 is rich, it will then adjust the fuel injectors 14 to reduce the amount of fuel that is sprayed into the cylinders of engine 12.

The proportional gain of the fuel control system is the amount by which the fuel injected into engine 12 is varied in response to the oxygen content signals received from oxygen sensors 24 and 26. It has been found that a new catalytic converter can tolerate a larger proportional gain, so as to achieve a greater converter efficiency, and, conversely, that an older catalytic converter can not tolerate the same magnitude of proportional gain useable with a new converter. For best converter efficiency, a smaller magnitude proportional gain is used with the old converter. According to the method of the present invention, the oxygen storage capacity ("OSC") of a catalytic converter is used to modify the proportional gain of the closed-loop fuel control to thereby increase catalyst efficiency and lower tail pipe emissions.

It has also been found that the condition of a catalytic converter can be determined from the OSC of the converter. One way of measuring OSC is to use the method used by the on-board catalyst diagnostic, called OBDII, which is typically performed once per automobile trip. According to this method, the time between a drop in the nominal voltage of the front 02 sensor 24 (e.g., 450 mV) as a result of a change from a rich to a lean engine operating condition and a drop in the nominal voltage of the rear 02 sensor 26 (e.g., 600 mV) as a result of the same change in engine operating condition is measured. This time delay is a measure of the catalyst's OSC. For a good, new catalyst, the time delay between the transitions of the front and rear 02 sensor voltages will be significantly longer (about 1.5 times longer) than for an older catalyst that is considered to be marginal by established emission standards.

The OSC for a given catalyst can also be determined using other catalyst diagnostics available from different automobile manufacturers. With these methods the amplitude of the swing in the nominal voltage for the rear 02 sensor or the number of swings of such voltage during a particular time may be measured.

A catalytic converter that is in good condition, such as a catalytic converter in a new automobile with less than 4,000 miles, contains the highest OSC. The OSC for a typical catalytic converter in good condition, such as a catalytic converter in a new car with less than 4,000 miles, is three times greater than the OSC for an old catalytic converter, such as one in an old automobile with 100,000 miles. The OSC for an old converter can, in turn, be three to four times greater than the OSC for a marginally acceptable converter for an Low Emission Vehicle ("LEV") system.

The engine control function "post 02 fuel control" has been previously used for fuel/emission control purposes. Typically, an optimum target based on the rear 02 sensor's nominal voltage is established for a new catalyst, but varied as the condition of the catalyst changes due to aging. For a new catalytic converter, the post 02 optimum target is set to be higher than that for that of an old converter because a new converter has a higher converter efficiency. This means that a newer converter can digest more upstream oxygen, leaving less oxygen for downstream. The rear 02 sensor 26 measures the amount of oxygen in the downstream exhaust gas. For a new catalytic converter, the down stream exhaust gas has very little oxygen due to the high efficiency of the converter's catalyst. This will result in a higher nominal voltage (e.g., 700 mV) for sensor 26 than where the exhaust gas contains more oxygen, as in case of an older converter (e.g., 450 mV). Here again, however, according to the method of the present invention, the OSC of the catalytic converter is used to modify the post 02 optimum target to thereby increase catalyst efficiency and lower tail pipe emissions.

The raw signals generated by sensors 24 and 26 are in the form of sinusoids, each of which swings around a particular nominal voltage. The nominal voltages around which these sinusoidal signals swing vary in response to the amount of oxygen in the engine's exhaust. The signal from rear 02 sensor 26 is used to trim the nominal voltage around which the signal generated by the front 02 sensor 24 swings. As the nominal voltage of rear 02 sensor 26 changes in response to the amount of oxygen measured by the rear 02 sensor, microcomputer 16 will adjust the nominal voltage of the front 02 sensor. The signal generated by the rear 02 sensor 26 is the key for fuel control since this signal is used by microcomputer 16 to trim the nominal voltage of the front 02 sensor 24, which, in turn, serves as a basis for the microcomputer's metering of the fuel injected into engine 12.

The front and rear 02 sensors 24 and 26 are usually calibrated to operate at nominal voltages that correspond to those for a converter between new and aged converters. By way of example, the nominal operating voltages for the rear and front 02 sensors may be about 600 mV and 450 mV, respectively, where the catalytic converter is of average age between an old and new converter. In this example, as the automobile engine starts to run rich, the rear 02 sensor signal will rise above the nominal 600 mV level. In response, microcomputer 16 will look to trim the nominal voltage for the front 02 sensor below its 450 mV level. Conversely, where the rear 02 sensor signal falls below 600 mV because the engine is running lean, microcomputer 16 will look to trim the nominal voltage for the front 02 sensor to a level above 450 mV.

Another engine control function that has been used in post 02 fuel control is "post 02 filter". The post 02 filter is a first order software filter which smoothes the fluctuation of the raw signal generated by the rear 02 sensor 26. Because a new catalytic converter behaves like a large physical filter, a strong software filter is not needed to smooth out the raw signal generated by rear 02 sensor 26. But as the catalytic converter ages, its ability to act as a physical filter decays due to a loss of OSC. At that point, the software filter is needed to smooth the raw signal 02 sensor 26. Again, it is desirable to have a "smooth" signal generated by the rear 02 sensor 26, since this signal is the key for fuel control. This signal is used by microcomputer 16 to trim the nominal voltage of the signal generated by the front 02 sensor 24, which, in turn, serves as a basis for microcomputer's metering of the fuel injected into engine 12.

Figure 2:
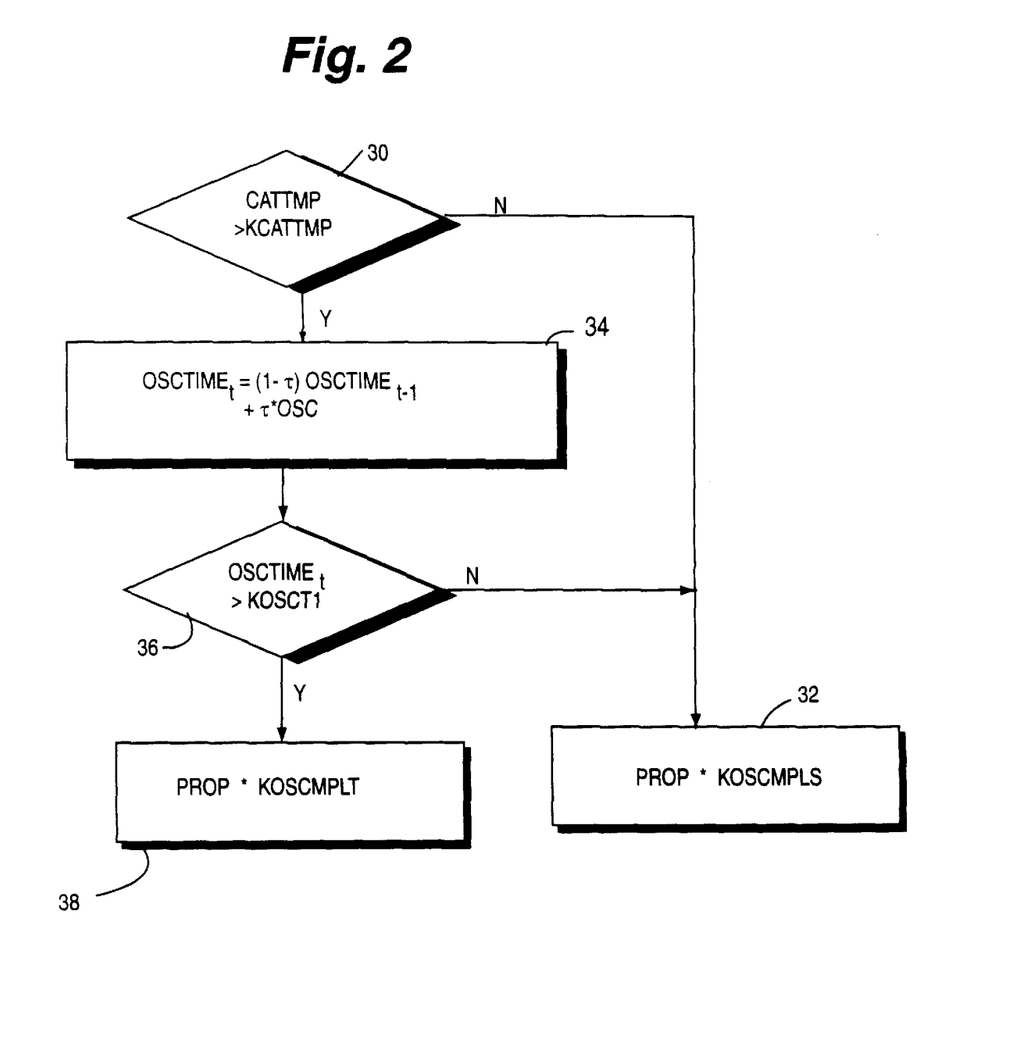
FIG. 2 is a flow chart for closed-loop fuel control using catalytic converter oxygen storage capacity in accordance with the present invention.
Figure 4:
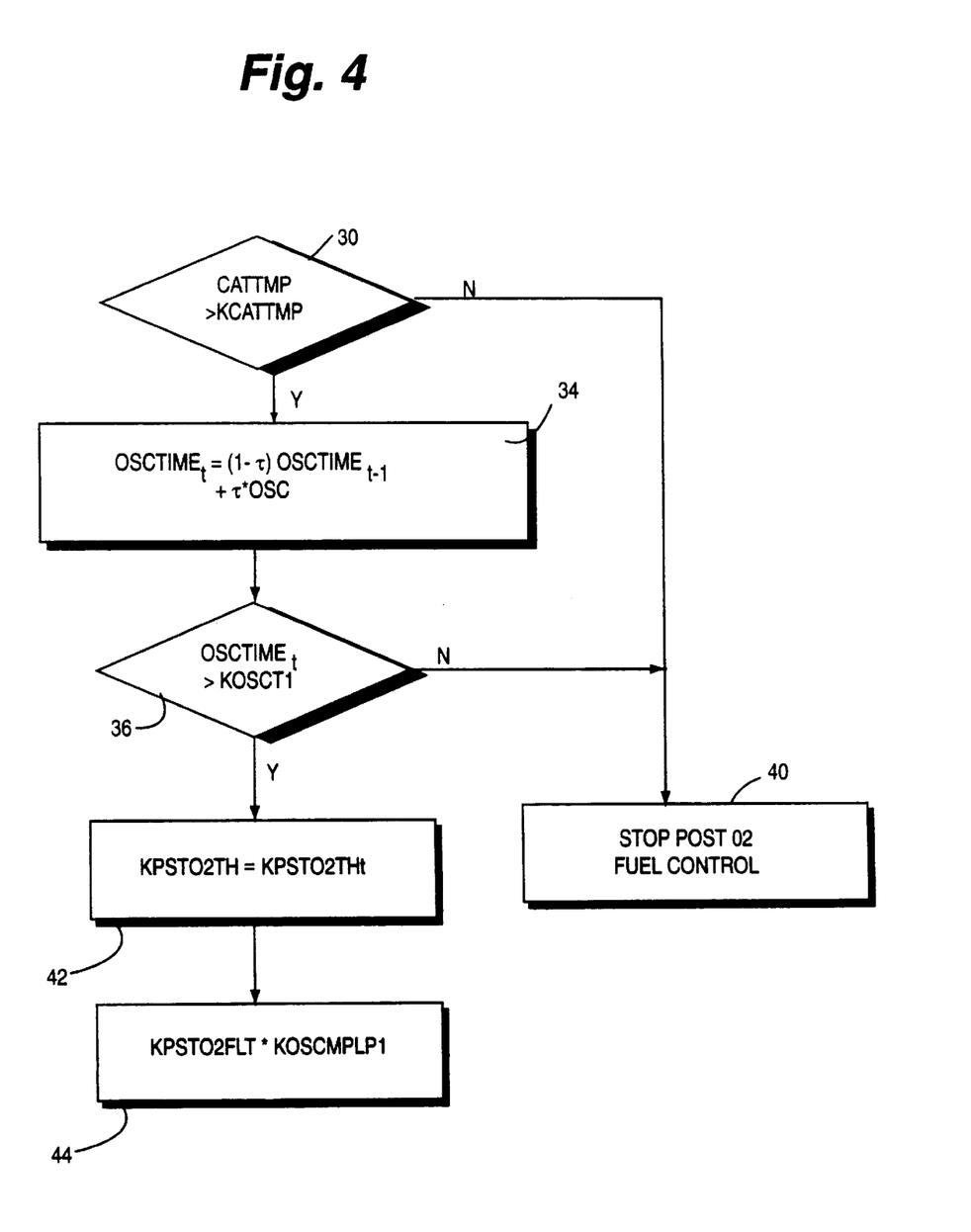
FIG. 4 is a flowchart for post O2 fuel control using catalytic converter oxygen storage capacity in accordance with the present invention.

FIG. 2 shows a flowchart for closed-loop fuel control using OSC in accordance with the present invention, while FIG. 4 shows a flowchart for post 02 fuel control also using OSC in accordance with the present invention. The variables set forth in these flowcharts are defined immediately below:

CATTMP: Predicted catalyst temperature

KCATTMP: Minimum catalyst running temperature

OSC: Actual measured catalyst OSC $OSCTIME_t$: Most recent OSC $OSCTIME_{t-1}$: Previous OSC τ: Exponentially Weighted Moving Average ("EWMA") filter, where τ varies from 0 to 1.

KOSCT1: Minimum OSC threshold, should be below threshold

PROP: Closed-Loop proportional gain

KOSCMPLT: A multiplier look-up table based on OSC.

KOSCMPLS: The smallest multiplier

KPST02TH: Post 02 target

KPST02THt: Post 02 target calibration table value based on OSC magnitude.

KPS02FLT: Post 02 filter (first order)

KOSCMPLP1: Multiplier for KPST02FLT (1-0)

Referring to FIG. 2 first, a predicted catalyst temperature is compared to the minimum catalyst running temperature at step 30. The predicted catalyst temperature for a given catalyst comes from the catalyst temperature prediction model that is developed by the particular automobile company using the catalyst. The predicted temperature is a function of engine RPM and air flow. If the predicted temperature is not greater than the minimum, then the closed-loop proportional gain is multiplied at step 32 by the smallest multiplier from a look-up table based on different values of OSC for the catalytic converter 22. One example of such a table is shown in FIG. 3.

If the predicted temperature is greater than the minimum, then the most recent OSC value for the catalyst in the catalytic converter 22 is calculated at step 34 to be a predetermined percentage of such value plus the actual OSC measured for such catalyst times a filter value τ, which can vary between 0 and 1. The filter value τ is varied on the basis of the EWMA function, which is a well known statistical function. Once the most recent OSC is calculated, it is compared at step 36 to the threshold OSC for the catalyst in catalytic converter 22. The threshold OSC is calibrated based on the results of satisfactory emissions testing according to the Federal Testing Procedure (FTP) for such testing.

If the most recent OSC is not greater than the threshold OSC for the catalyst, then the closed-loop proportional gain is again multiplied at step 32 by the smallest multiplier. Conversely, if the most recent accumulated OSC is greater than the catalyst threshold OSC, then the closed-loop proportional gain is multiplied at step 38 by a multiplier from the look-up table based on different values of OSC for the catalytic converter 22.

Figure 3:
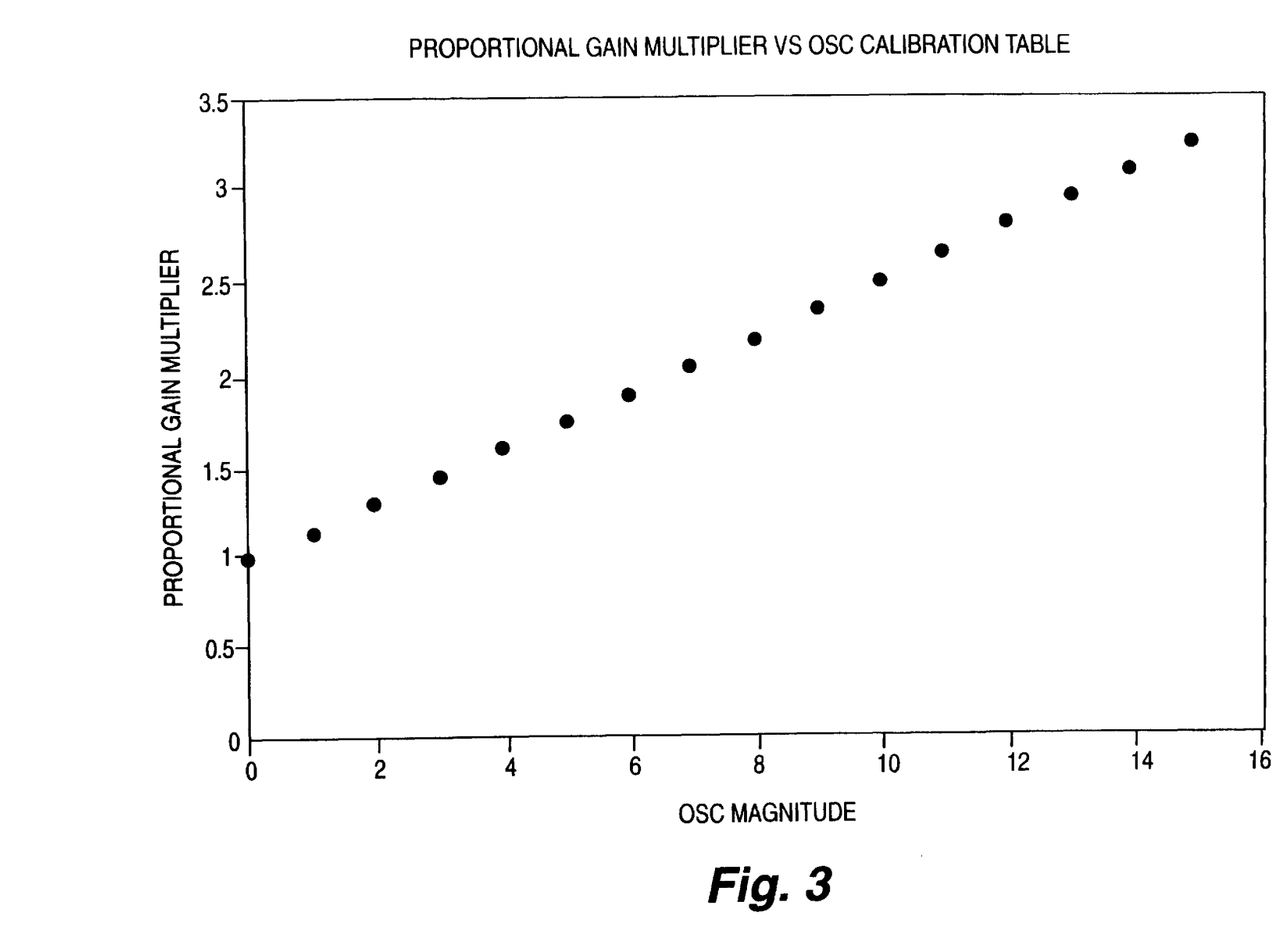
FIG. 3 is a chart showing the relationship between OSC magnitude and the proportional gain multiplier used in closed loop fuel control.

In the example of such a table shown in FIG. 3, the x-axis is the OSC magnitude. These numbers can be anything, such as "0" to "100" or "1" to "16", as shown in FIG. 3. These numbers serve to indicate the range of the OSC, varying from the minimum, e.g., "0", to the maximum, e.g., "16".

The y-axis of FIG. 3 is the proportional gain multiplier, which varies from "1"for an OSC of "0", to about "3.25"for an OSC of about "15". The proportional gain multipliers, such as those shown in FIG. 3, would be different for different engine families. The multipliers are calibrated to get optimum catalyst efficiency, which in turn, is measured from emissions testing. This fuel calibration is a closed-loop control that is based on Proportional Integral Derivative (PID) control.

Referring to FIG. 4, the flowchart for post 02 fuel control using OSC magnitude includes the first three steps 30, 34 and 36 used in the flowchart in FIG. 2 for carrying out the method of the present invention, except that where the predicted catalyst temperature is less than the minimum catalyst running temperature, or where the most recent OSC calculated in step 34 is less than the minimum threshold OSC for the catalyst, the post 02 fuel control is terminated at step 40.

Figure 5:
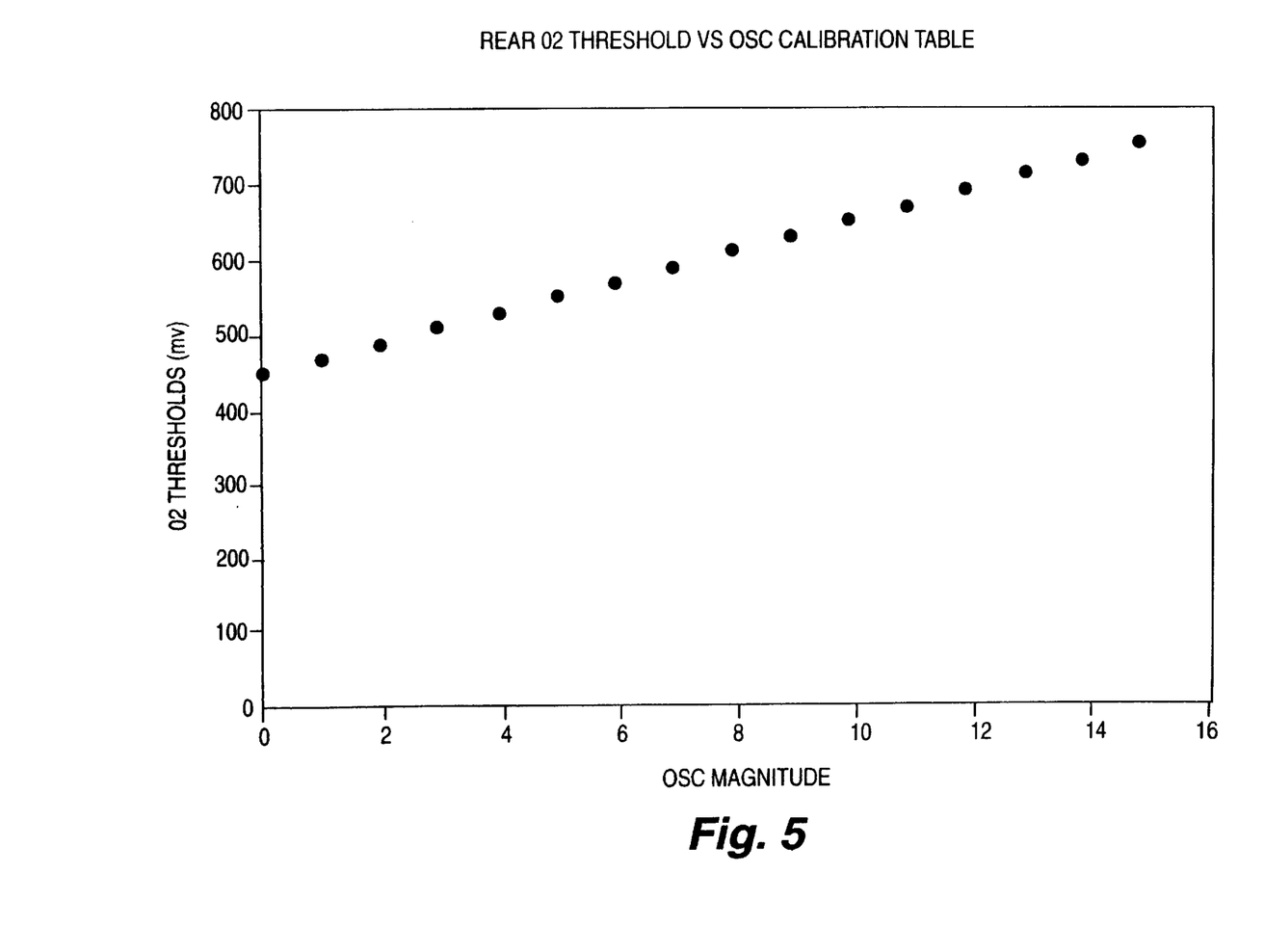
FIG. 5 is a chart showing the relationship between OSC magnitude and O2 Threshold voltage.

If the most recent OSC is determined at step 36 to be greater than the minimum threshold catalyst OSC, the post 02 target is set at step 42 to a calibration table value that is based on OSC magnitude. One example of such a table is shown in FIG. 5. Like FIG. 3, the x-axis again shows OSC magnitude. The y-axis, however, shows the 02 threshold in mV. For a new catalyst, the OSC is shown in FIG. 5 as being about "15", while the 02 threshold is set to be about 750 mV. As the catalyst ages, the OSC drops in FIG. 5 to "0", and the 02 threshold is then set to be about 450 mV. The modification to the nominal target voltage for the rear 02 sensor 26 results in microcomputer 16 adjusting the nominal target voltage for the front 02 sensor 24.

Besides modifying the post 02 target voltage in response to changes in OSC magnitude, the method of the present invention also modifies the post 02 filter used by the microcomputer 16 to smooth out the raw signal generated by the 02 sensor 26. At step 44 of the flowchart shown in FIG. 4, the post 02 filter is multiplied by a multiplier between 0 and 1.

Figure 6:
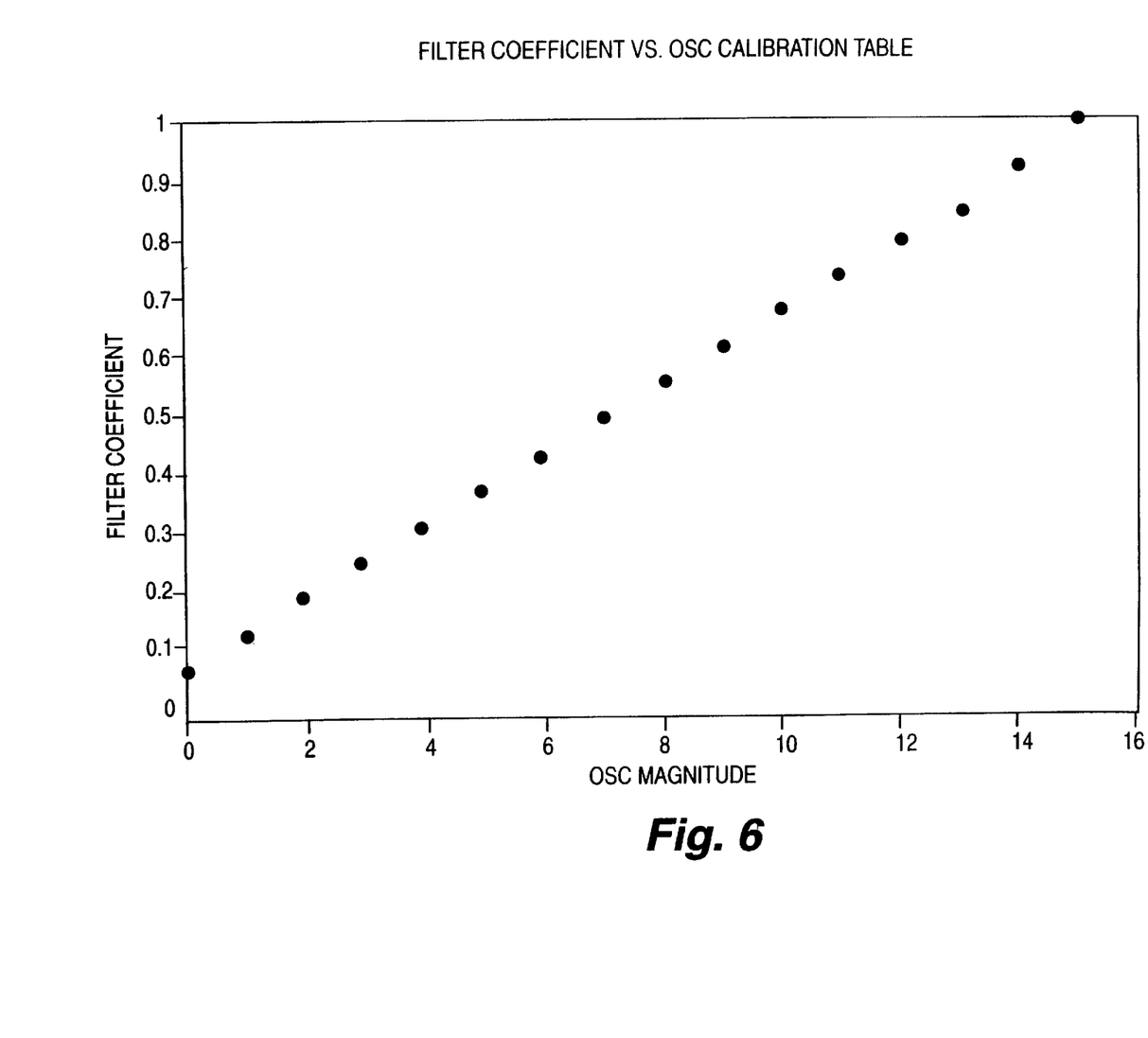
FIG. 6 is a chart showing the relationship between OSC magnitude and the filter coefficient used in Post O2 fuel control.

FIG. 6 is a chart showing the variation in the filter multiplier, referred to as a "Filter Coefficient" in FIG. 6, as the magnitude of the catalyst OSC varies. Thus, for example, for a new catalyst where the OSC is shown in FIG. 6 to have a magnitude of approximately 15, the filter coefficient or multiplier is "1". Conversely, for an old catalyst where the OSC is shown to be "0", the filter coefficient is approximately "0.05". A small filter value (e.g., close to "0") is stronger than a large filter value (e.g., close to "1"). The filter table is calibrated to provide a smooth (e.g., "flat") post 02 signal; but, the filter can not be too strong, since it may neutralize the post 02 signal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of fuel control for an engine whose exhaust is treated by a catalyst and which includes a fuel control system for controlling the amount of air and fuel injected into the engine comprising:

determining said catalyst oxygen storage capacity ("OSC"), selecting a predetermined multiplier based on said OSC, and adjusting said fuel control system proportional gain using said selected predetermined multiplier.

2. A method of fuel control as recited in claim 1 further comprising:

setting a post 02 target voltage used by said fuel control system to a predetermined level based on said OSC.

3. A method of fuel control as recited in claim 1 wherein said OSC is determined using signals from a first exhaust 02 sensor located ahead of said catalyst and a second exhaust 02 sensor located after said catalyst.

4. A method of fuel control as recited in claim 3 further comprising:

using a second predetermined multiplier based on said OSC to adjust a post 02 filter used by said fuel control system to smooth the signal from said second 02 sensor.

5. A method of fuel control as recited in claim 2 wherein said catalyst OSC is determined by measuring a delay time between a drop in voltage generated by a first 02 sensor as a result of a change in said engine air/fuel mixture and a drop in voltage generated by a second 02 sensor as a result of said air/fuel mixture change, said first 02 sensor being located ahead of said catalyst and said second 02 sensor being located after said catalyst.

6. A method of fuel control as recited in claim 2 wherein said catalyst OSC is determined by measuring an amplitude of a drop in voltage generated by an 02 sensor as a result of a change in said engine air/fuel mixture, said 02 sensor being located after said catalyst.

7. A method of fuel control as recited in claim 2 wherein said catalyst OSC is determined by measuring a number of swings in a voltage generated by an 02 sensor as a result of a change in said engine air/fuel mixture, said 02 sensor being located after said catalyst.

8. A method of fuel control as recited in claim 1 wherein said predetermined multiplier is selected to increase said fuel control system proportional gain when said OSC is high, as in a new catalyst.

9. A method of fuel control as recited in claim 1 wherein said predetermined multiplier is selected to decrease said fuel control system proportional gain when said OSC is low, as in an old catalyst.

10. A method of fuel control as recited in claim 2 wherein said post 02 target voltage level is set high when said OSC is high, as in a new catalyst.

11. A method of fuel control as recited in claim 2 wherein said post 02 target voltage level is set low when said OSC is low, as in an old catalyst.

12. A method of fuel control as recited in claim 2 wherein said post 02 filter is substantially zero when said OSC is high, as in a new catalyst.

13. A method of fuel control as recited in claim 2 wherein said post 02 filter is substantially one when said OSC is low, as in an old catalyst.

14. A method of engine fuel control using oxygen storage capacity ("OSC") of a catalyst in a catalytic converter comprising:

determining whether a predicted temperature for said catalyst is greater than a minimum running temperature for said catalyst, if so, setting said OSC of said catalyst to be equal to a first predetermined percentage of a previous OSC for said catalyst plus a second predetermined percentage of an actual measurement of said OSC for said catalyst, determining whether said current OSC is greater than a predetermined minimum OSC, if so, selecting a predetermined multiplier based on said OSC, and multiplying a proportional gain of said engine's fuel control system by said selected predetermined multiplier, and if not, multiplying said proportional gain by a minimum multiplier.

15. A method of fuel control as recited in claim 14 further comprising:

setting a post 02 target voltage used by said fuel control system to a predetermined level based on said OSC, and adjusting a post 02 filter used by said fuel control system using a second predetermined multiplier.

\* \* \* \* \*